United States Patent [19]

Mitchell et al.

[11] Patent Number: 4,619,870
[45] Date of Patent: Oct. 28, 1986

[54] JOINING STRIP FOR PANELS

[76] Inventors: Norman J. Mitchell, 12 Bilmark Place, Brighton Le Sands, New South Wales 2216; Alexander G. Mitchell, 29 Craigholm Street, Sylvania Heights, New South Wales 2224, both of Australia

[21] Appl. No.: 589,547

[22] Filed: Mar. 14, 1984

[30] Foreign Application Priority Data

Mar. 16, 1983 [AU] Australia ............... PF8473

[51] Int. Cl.⁴ .................. F16B 13/00; E04C 2/32
[52] U.S. Cl. .................. 428/596; 428/598; 428/604; 52/814; 52/585
[58] Field of Search ............. 428/593, 594, 596, 599, 428/603, 604, 598; 52/537, 582, 585, 630, 814, 585; 403/393, 375, 341

[56] References Cited

U.S. PATENT DOCUMENTS

| | | | |
|---|---|---|---|
| 2,076,472 | 4/1937 | London | 52/630 |
| 2,181,831 | 11/1939 | McLaughlin, Jr. | 52/582 |
| 2,193,994 | 3/1940 | Weaver | 52/585 |
| 2,256,791 | 9/1941 | Schroeder | 52/578 |
| 2,666,241 | 1/1954 | Hall, Sr. | 52/582 |
| 2,672,958 | 3/1954 | Pierce | 52/585 |
| 2,771,164 | 11/1956 | Scurlock | 52/630 |
| 3,012,639 | 12/1961 | Pavlecka | 52/582 |
| 3,217,845 | 11/1965 | Reynolds et al. | 428/604 |
| 3,501,878 | 3/1970 | Segal | 52/537 |
| 3,869,778 | 3/1975 | Yancey | 428/593 |

FOREIGN PATENT DOCUMENTS 939682 7/1982 U.S.S.R. ............... 52/630

Primary Examiner—L. Dewayne Rutledge
Assistant Examiner—John J. Zimmerman
Attorney, Agent, or Firm—Welsh & Katz, Ltd.

[57] ABSTRACT

A panel having an edge strip which nests with an edge strip of an adjacent panel to enable the panels to be fixed together by passing a pin through aligned holes formed in the edge strips.

5 Claims, 8 Drawing Figures

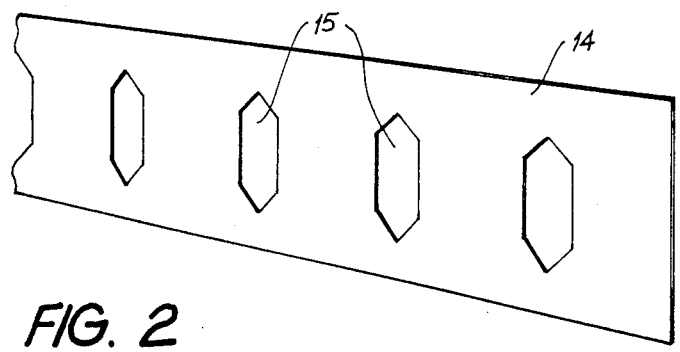
FIG. 2
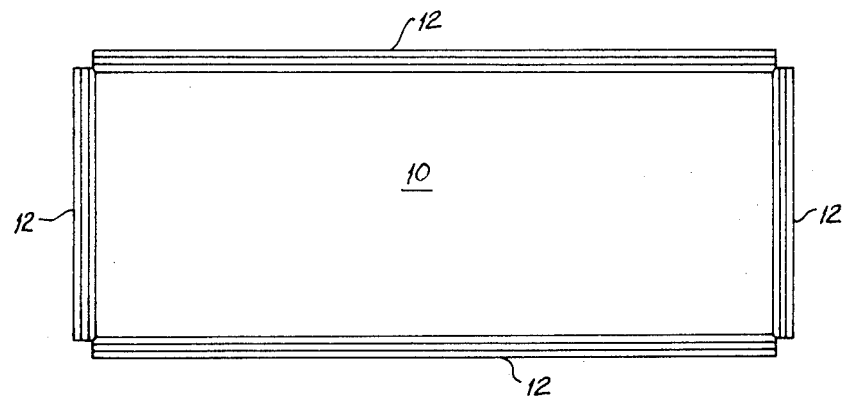
FIG. 3
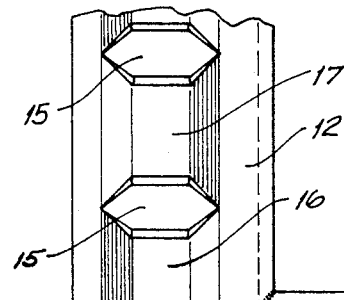
FIG. 4
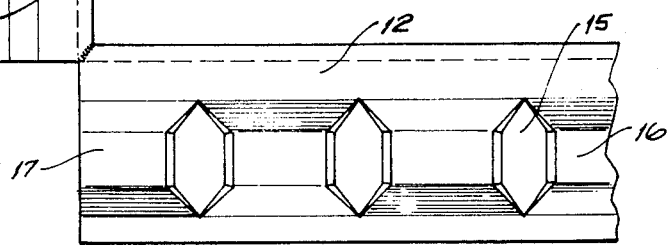

JOINING STRIP FOR PANELS

The present invention relates to panels, particularly sheet metal panels which may be used to construct various containers as well as forming the walls of mines and shafts.

The present invention relates to Australian Pat. No. 429621 and more specifically is an improvement therein Australian Pat. No. 429621 describes a metal panel which could be joined to similar panels having a particular edge strip allowing the panels to be joined. This known panel had a few disadvantages in that the panels could only be joined from outside the structure. Additionally, the pin joining the panels could only be inserted from an end outside of the structure thereby making it impossible for the panel to be used in restricted areas such as mine shafts. Additionally, the panels could not be joined if the edge strip was damaged or bent.

It is the object of the present invention to overcome or substantially ameliorate the above disadvantages.

There is disclosed herein an edge strip for a panel enabling the panel to be joined to an adjacent panel having a complementary edge strip, said edge strip having a plurality of longitudinally spaced holes separated by alternate depressions and ridges which are nested with the ridges and depressions of the complementary edge strip.

A preferred form of the present invention will now be described by way of example with reference to the accompanying drawings wherein:

FIG. 2 is a schematic perspective view of a metal ribbon employed to manufacture the edge strip of the panel of FIG. 1;

FIG. 3 is a schematic plan view of the panel of FIG. 1;

FIG. 4 is a schematic plan view of the edge strip of the panel of FIG. 1;

Figure 1:
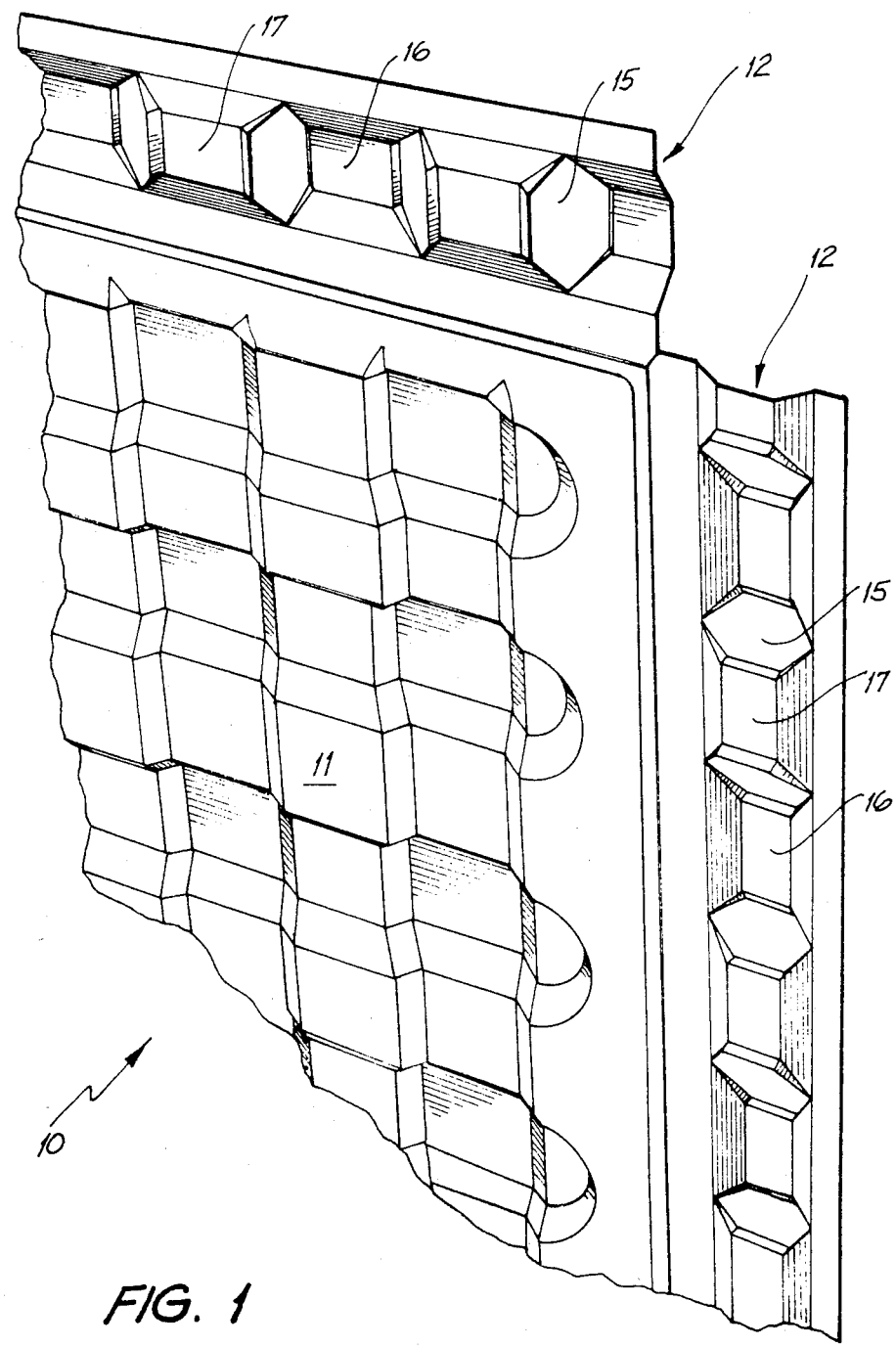
FIG. 1 is a schematic perspective view of a panel having an edge strip enabling the panel to be attached to similarly constructed panels.
Figure 5:
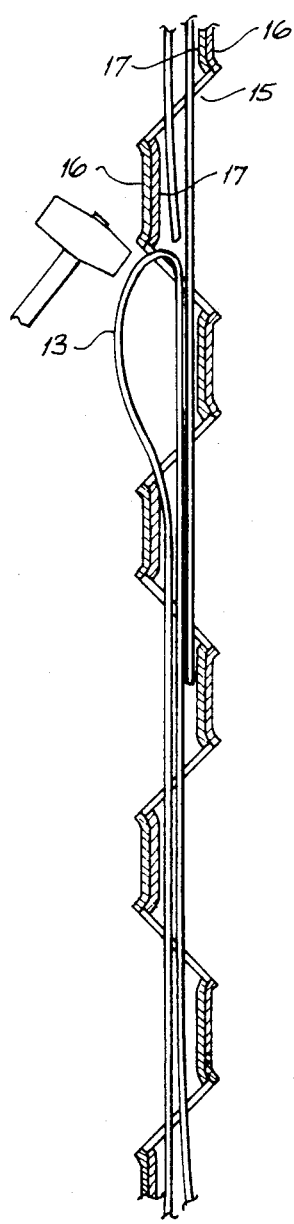
FIG. 5 is a schematic sectioned side elevation of the panel of FIG. 1 joined to a complementary panel by means of a pin.
Figure 6:
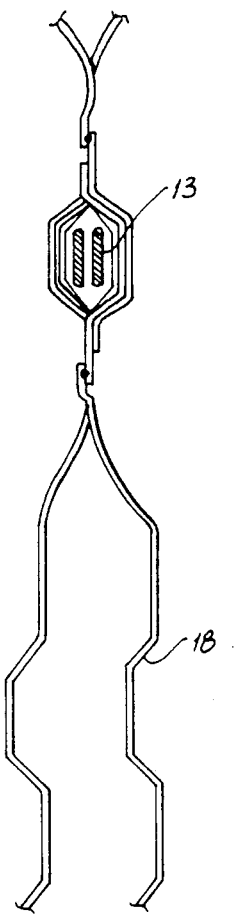
FIG. 6 is a schematic plan view of the panel of FIG. 1 joined to a complementary panel.

In FIG. 1 there is schematically depicted a panel 10 having major sides 11 which are deformed so as to have intersecting grooves of various depths. The panel 10 is provided with edge strips 12 which enable the panel to be attached to similar panels having edge strips complementary to 12 by the use of a pin 13 as seen in FIGS. 5 and 6. Each edge strip 12 is formed of a metal ribbon 14 as seen in FIG. 2, which metal ribbon 14 is punched so as to have a plurality of holes 15 which are spaced longitudinally of the ribbon 14. The ribbon 14 is then deformed so as to have alternate depressions 16 and ridges 17 being located between the holes 15, which depressions 16 and ridges 17 protrude from the general plane of the ribbon 14.

When panels having complementary edge strips 12 are joined, the edge strips are nested as seen in FIG. 5. This enables the holes 15 to be aligned and a pin 13 inserted therethrough as also depicted in FIG. 5. The pin 13 may be a metal rod or metal strip depending on the strength requirement of the structure being formed by the panels 10.

Figure 7:
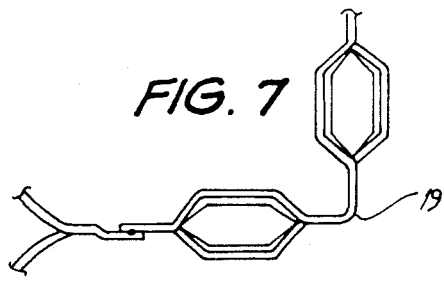
FIG. 7 is a schematic plan view of a similar panel to that of FIG. 1 enabling the panel to form corners in structures.
Figure 8:
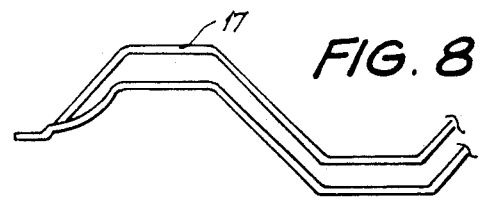
FIG. 8 is a schematic plan view of a portion of the panel of FIG. 1.

As can be seen from FIGS. 6, 7 and 8, the panel 10 may be formed with deep ridges 17 which extend across the sides 11 and intersect with shallow ridges 18.

Additionally, the panels 10 may be formed with a right angle portion 19 to enable formation of structures having inclined sides.

It should further be noted that the panel 10 may be curved thus enabling a plurality of panels 10 to be joined in forming a circular structure.

The above-described preferred embodiment of the present invention has several advantages which are as follows:

1. The pin 13 may be inserted in the holes 15 from either side of the panel 10,
2. Even if the panel 10 is damaged the pin may still be inserted or removed,
3. Two or more panels may be joined along their edges, and
4. The panels may be joined so as to form a closed construction such as a rectangular storage container.

What we claim is:

1. A single metal sheet of relatively thin dimensions defining a plane, said sheet having at least one marginal edge defining an edge strip adapted for mutual cooperation with a complimentary edge strip of an adjacent similar sheet so as to facilitate joining of said adjacent sheets, said edge strip defining a primary plane generally parallel to said plane of said sheet and having a plurality of serially adjacent alternate depressions and ridges formed outwardly from the said primary plane in a manner to facilitate nesting when placed in juxtaposed relation with said complimentary edge strip of said adjacent sheet, said adjacent sheet being generally coplanar with respect to said plane of said sheet, each adjacent pair of said alternate depressions and ridges having an opening formed therebetween defined by inclined marginal edges operative to engage in a nesting relationship corresponding inclined marginal edges on said complimentary edge strip so as to effect longitudinal alignment of said openings in a manner to enable insertion of an elongated retainer pin through said openings.

2. A panel as defined in claim 1 wherein said inclined marginal edges form an acute angle of inclination relative to said primary plane.

3. The panel of claim 1 wherein said pin is a metal strip or rod.

4. The panel of claim 1 wherein said panel is formed of sheet metal.

5. The panel of claim 1 wherein said opening is located in a plane extending at an acute angle to the general plane of the panel.

* * * * *